(12) United States Patent
Aliane

(10) Patent No.: US 9,702,766 B2
(45) Date of Patent: Jul. 11, 2017

(54) CAPACITIVE TEMPERATURE SENSOR COMPRISING TWO CAPACITORS AS A VOLTAGE DIVIDER BRIDGE

(71) Applicant: COMMISSARIAT A L'ENERGIE ATOMIQUE ET AUX ENERGIES ALTERNATIVES, Paris (FR)

(72) Inventor: Abdelkader Aliane, Grenoble (FR)

(73) Assignee: COMMISSARIAT A L'ENERGIE ATOMIQUE ET AUX ENERGIES ALTERNATIVES (FR)

( * ) Notice: Subject to any disclaimer, the term of this patent is extended or adjusted under 35 U.S.C. 154(b) by 469 days.

(21) Appl. No.: 14/364,032

(22) PCT Filed: Nov. 19, 2012

(86) PCT No.: PCT/FR2012/052663
§ 371 (c)(1),
(2) Date: Jun. 9, 2014

(87) PCT Pub. No.: WO2013/102709
PCT Pub. Date: Jul. 11, 2013

(65) Prior Publication Data
US 2014/0321507 A1    Oct. 30, 2014

(30) Foreign Application Priority Data

Jan. 2, 2012 (FR) .................................. 12 50022

(51) Int. Cl.
*G01K 7/34* (2006.01)
(52) U.S. Cl.
CPC ............... *G01K 7/343* (2013.01); *G01K 7/34* (2013.01)

(58) Field of Classification Search
CPC ...................................................... G01K 7/34
See application file for complete search history.

(56) References Cited

U.S. PATENT DOCUMENTS 3,753,373 A   8/1973 Brown
3,774,089 A   11/1973 Lewis
(Continued)

FOREIGN PATENT DOCUMENTS

FR   1325126 A        4/1963
JP   2008061472 A  *  3/2008

OTHER PUBLICATIONS

International Search Report Application No. PCT/FR2012/052663 Completed: Mar. 15, 2013; Mailing Date: Apr. 8, 2013 2 pages.

*Primary Examiner* — Gail Kaplan Verbitsky
(74) *Attorney, Agent, or Firm* — St. Onge Stewards Johnston & Reens LLC

(57) ABSTRACT

A temperature sensor including a capacitive circuit including an input terminal for the application of an input voltage, an output terminal for the reading of an output voltage of the circuit, and a reference potential terminal, a voltage circuit for applying a predetermined voltage to the input terminal of the circuit and a circuit for reading the voltage at the output terminal of the capacitive circuit and converting the read voltage into a temperature measurement. According to the invention, the capacitive circuit includes a fir capacitor, connected between the input and output terminals, and having a capacitance decreasing according to temperature; and a second capacitor, connected between the input terminal and the terminal at the reference potential, and having a capacitance increasing along with temperature.

13 Claims, 4 Drawing Sheets

(56) References Cited

U.S. PATENT DOCUMENTS

| | | | | | |
|---|---|---|---|---|---|
| 4,010,726 | A | * | 3/1977 | Kondo | F02P 9/005 |
| | | | | | 123/599 |
| 4,419,660 | A | * | 12/1983 | Bergdahl | H02M 1/14 |
| | | | | | 333/17.1 |
| 4,636,913 | A | * | 1/1987 | Mobbs | H03H 7/54 |
| | | | | | 361/182 |
| 4,639,697 | A | * | 1/1987 | Yarranton | H03H 9/68 |
| | | | | | 310/313 R |
| 4,703,886 | A | * | 11/1987 | Kirby | G05D 23/24 |
| | | | | | 165/222 |
| 5,862,170 | A | * | 1/1999 | Britton, Jr. | G01K 7/34 |
| | | | | | 307/651 |
| 6,333,728 | B1 | * | 12/2001 | Libsch | G02F 1/133382 |
| | | | | | 345/87 |
| 8,217,708 | B2 | * | 7/2012 | Yoshikawa | G01K 7/01 |
| | | | | | 323/316 |
| 9,515,243 | B2 | * | 12/2016 | Kegler | H01L 35/04 |
| 9,523,615 | B1 | * | 12/2016 | Perrott | G01K 7/226 |
| 2002/0033453 | A1 | * | 3/2002 | Sauer | C07D 405/06 |
| | | | | | 250/338.1 |
| 2005/0238081 | A1 | * | 10/2005 | Takashima | G01K 7/343 |
| | | | | | 374/184 |
| 2006/0164868 | A1 | * | 7/2006 | Weber | H02M 1/32 |
| | | | | | 363/16 |
| 2007/0216425 | A1 | * | 9/2007 | Okamura | H01G 9/14 |
| | | | | | 324/678 |
| 2014/0021965 | A1 | * | 1/2014 | De Rybel | G01R 15/16 |
| | | | | | 324/632 |

* cited by examiner

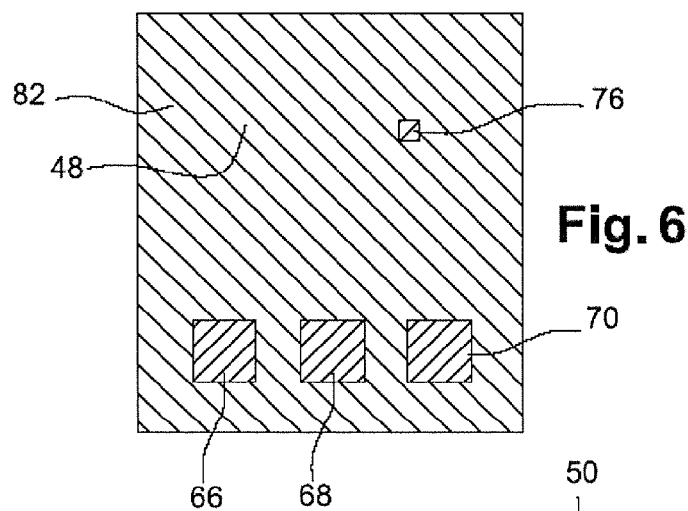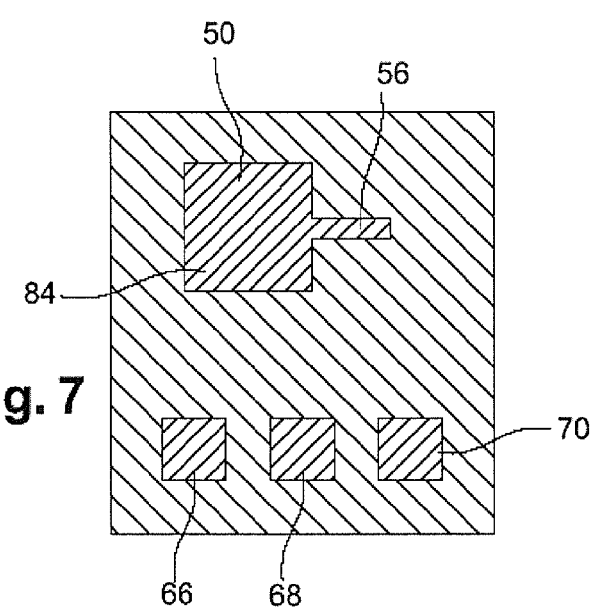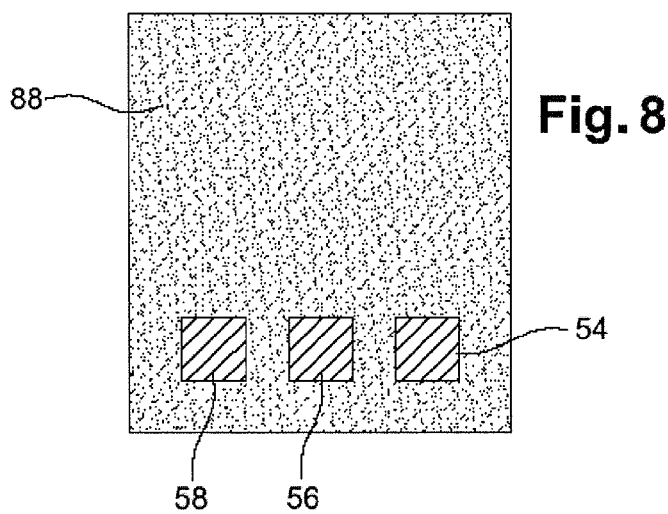

CAPACITIVE TEMPERATURE SENSOR COMPRISING TWO CAPACITORS AS A VOLTAGE DIVIDER BRIDGE

FIELD OF THE INVENTION

The invention relates to the field of temperature sensors, and more particularly capacitive temperature sensors.

BACKGROUND OF THE INVENTION

As known per se, the capacitance of a capacitor varies according to temperature. By measuring this capacitance or any other variable directly associated therewith, and knowing the relationship between the temperature and the capacitance value, it is thus possible to measure the capacitor temperature. This principle is the base of so-called "capacitive" temperature sensors. The use of a single capacitor however does not provide a sufficient capacitance variation range to obtain an accurate measurement of the temperature over a wide range.

SUMMARY OF THE INVENTION

The present invention aims at providing a capacitive sensor of simple design, having a high sensitivity over a wide temperature range.

For this purpose, the present invention aims at a temperature sensor comprising:
- a capacitive circuit comprising an input terminal for the application of an input voltage, an output terminal for the reading of an output voltage of the circuit, and a reference potential terminal;
- a voltage circuit for applying a predetermined voltage to the input terminal of the circuit; and
- a circuit for reading the voltage at the output terminal of the circuit and converting the read voltage into a temperature measurement.

According to the invention, the capacitive circuit comprises:
- a first capacitor, connected between the input and output terminals, and having a capacitance decreasing according to temperature; and
- a second capacitor, connected between the input terminal and the terminal at the reference potential, and having a capacitance increasing along with temperature.

In other words, the output voltage of the capacitive circuit thus follows relation:

$$V_{out}(T) = \frac{C_1(T) + C_2(T)}{C_1(T)} \times V_{in}$$

where:
- $V_{in}$ is the voltage between the input terminal and the reference terminal of the capacitive circuit;
- $V_{out}$ is the voltage between the output terminal and the reference terminal of the capacitive circuit;
- T is the temperature of the capacitive circuit;
- $C_1$ is the capacitance of the first capacitor; and
- $C_2$ is the capacitance of the second capacitor.

Thus, by using such an assembly, a very high sensitivity is obtained over a wide temperature range, particularly due to variations of capacitance $C_2$ according to temperature. Starting from the expression of $V_{out}$, particularly for low and medium frequencies, when the temperature increases, the value of capacitance $C_2$ increases while, in the mean time, the value of capacitance $C_1$ decreases. Thus, the value of $V_{out}$ at the sensor output increases. When the temperature decreases, the value of capacitance $C_2$ decreases while, in the mean time, the value of capacitance $C_1$ increases, which implies a decrease in the value of $V_{out}$ at the output. The strong variation of the value of $V_{out}$ at the sensor output accompanying the variation of the temperature, for a constant $V_{in}$, thus implies a high sensitivity. Such an assembly behaves as an amplifying assembly and enables to have a maximum response at the capacitive circuit output.

According to an embodiment of the invention, the capacitive circuit comprises an insulating substrate and a stack formed on the substrate, successively comprising:
- a first conductive electrode formed on the substrate;
- a layer of a first dielectric;
- a second conductive electrode;
- a layer of a second dielectric; and
- a third conductive electrode, the first capacitor being formed by the first dielectric layer sandwiched between the first electrode and the second electrode, and the second capacitor being formed by the second dielectric layer sandwiched between the second electrode and the third electrode More specifically:
- a first, a second, and a third different conductive tracks, each comprising a conductive connection area, are formed on the insulating substrate, the first track being connected to the first electrode;
- the first dielectric layer is deposited on at least the first electrode and a portion of the second track;
- the second metal electrode is deposited on the first dielectric layer at least vertically above the first electrode and a portion of the second track, the second electrode being connected to the second track by means of a metal connection crossing the first dielectric layer;
- the second dielectric layer is deposited on at least the second electrode and vertically above a portion of the third track; and
- the third metal electrode is deposited on the second dielectric layer at least vertically above the second electrode and a portion of the third track, the third electrode being connected to the third track by means of a metal connection crossing the first and second dielectric layers.

A compact system is thus obtained, since there only exist three electrodes for two capacitors and the same are stacked on each other. This circuit may have a wide range of capacitor surface areas, particular large surface area, and may be formed by means of simple manufacturing techniques.

According to an embodiment, the dielectric of the first capacitor is a fluorinated polymer having a dielectric constant smaller than or equal to 2, for example, a dielectric constant equal to 2 ($\in_r=2$).

Such a fluorinated polymer is characterized by a low adherence to the second metal electrode deposited thereon, for example, by silk screening of a silver-based ink. Such a characteristic low adherence enables to create microgaps between this fluorinated dielectric polymer and the second conductive electrode. Such microgaps will generate a variable electric capacitance which will be taken into account in the total specific electric capacitance of the fluorinated polymer. This can enable to have a very good sensitivity to temperature and to capacitive touch effects.

Particularly, the first dielectric layer has a thickness in the range from 0.1 micrometer to 2 micrometers.

Advantageously, the sensor comprises a circuit for reading the capacitance of the first capacitor and for converting the read capacitance into a temperature measurement detected on the first capacitor. A capacitive pressure sensor is thus obtained with no additional capacitive component.

According to an embodiment, the dielectric of the second capacitor is a ferroelectric polymer or copolymer, particularly polyvinylidene fluoride-chlorotrifluoroethylene, or a polyvinylidene fluoride, or a copolymer of one and/or the other thereof. Such a polymer has very large capacitance variations according to temperature. More particularly, the second dielectric layer has a thickness in the range from 1 micrometer to 5 micrometers.

Advantageously, the first dielectric is a piezoelectric ferroelectric polymer or copolymer, and the sensor comprises a circuit for reading the voltage at the input terminal and for converting the measurement of a pressure applied to the electrodes of the second capacitor into a read voltage. A capacitive touch sensor is thus obtained with no additional capacitive component.

According to an embodiment, each of the first, second, and third electrodes has a thickness in the range from 30 nanometers to 15 micrometers.

According to an embodiment, the substrate is a flexible plastic substrate, particularly made of PEN (polyethylene naphthalate) or of PET (polyethylene terephthalate), which enables to form a flexible capacitive circuit and to increase the sensitivity of the pressure sensor and of the touch sensor.

BRIEF DESCRIPTION OF THE DRAWINGS

The present invention will be better understood on reading of the following description provided as an example only in relation with the accompanying drawings, where the same reference numerals designate the same or similar elements, among which:

FIGS. 3 to 8 are simplified top views of a method of manufacturing a capacitive circuit comprising the stack of FIG. 2.

DETAILED DESCRIPTION OF THE INVENTION

Figure 1:
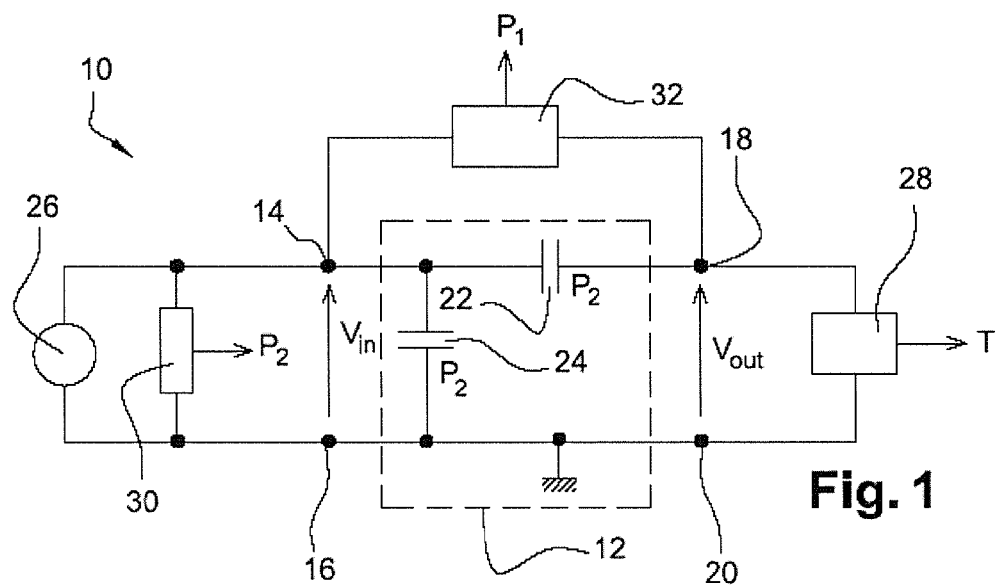
FIG. 1 is a simplified view of a pressure sensor according to the invention.

Referring to FIG. 1, a temperature sensor 10 according to the invention comprises a capacitive circuit 12 having two input terminals 14, 16 and two output terminal 18, 20, and having its voltage transfer function from a voltage $V_{in}$ applied between input terminals 14, 16 to a resulting output voltage $V_{out}$ between output terminals 18, 20 varying in known fashion according to the temperature of circuit 12.

More particularly, input terminal 16 and output terminal 20 are reference terminals and are taken to a same potential, for example, a ground potential, and capacitive circuit 12 comprises a first capacitor 22, connected between input terminal 14 and output terminal 18, and a second capacitor 24, connected between input terminals 14, 16.

The transfer function between voltage $V_{out}$ and voltage $V_{in}$ is thus provided by relation:

$$V_{out}(T) = \frac{C_1(T) + C_2(T)}{C_1(T)} \times V_{in} \qquad (1)$$

where:
$T$ is the temperature of capacitive circuit 12;
$C_1$ is the capacitance of first capacitor 22; and
$C_2$ is the capacitance of second capacitor 24.

First capacitor 22 has a capacitance which decreases according to temperature T. More particularly, first capacitor 22 comprises a dielectric interposed between two conductive electrodes, for example, metallic or organometallic, and made of a fluorinated polymer having a low dielectric constant smaller than or equal to 2 ($\in_r = 2$), for example, a dielectric constant equal to 2.

Second capacitor 24 has a capacitance which increases along with temperature T. More specifically, second capacitor 24 comprises a dielectric interposed between two conductive electrodes, for example, metallic or organometallic, and made of a ferroelectric polymer or copolymer.

The expression of $V_{out}$ in relation (1) can be rewritten, for a constant voltage $V_{in}$, according to relation:

$$V_{out}(T) = S \times T + V_0 \qquad (2)$$

where:
S is the detector sensitivity expressed in V/° C.; and
$V_0$ is a threshold voltage.
Sensitivity S is thus equal to $$S = \frac{\partial V_{out}}{\partial T}\bigg|_{V_{in}=constante}$$

Temperature sensor 10 further comprises a voltage source 26 for applying a predetermined voltage $V_{in}$ between input terminals 14, 16, as well as a read circuit 28 connected to output terminals 18, 20 for reading the voltage $V_{out}$ and analyzing the measurement thereof.

More particularly, read circuit 28 comprises means for sampling the measured voltage and means for polling a table of output voltages measured according to the detected temperature, said table being previously determined and stored in circuit 28.

The dielectric of second capacitor 24 is a ferroelectric material which also has piezoelectric properties after the dipoles have been oriented in the ferroelectric material. This material is advantageously made of polyvinylidene fluoride-chlorotrifluoroethylene (also called "PVDF-CTFE"), a polyvinylidene fluoride, or the copolymer of one and/or the other thereof. To have the piezoelectric properties (that is, the material generates electric charges when a force is exerted thereon), it is necessary to orient the dipoles by applying a strong D.C. electric field of a value in the order of 2 V/µm at 50-60° C. for several hours. Sensor 10 comprises a circuit 30 connected between terminals 14, 16 and capable of determining a pressure exerted on second capacitor 22 according to the voltage $V_{in}$ measured when current source 26 is disconnected from input terminals 14, 16.

Circuit 30 for example comprises means for sampling the measured voltage and means for polling a table of pressures according to the measured pressure, said table being previously determined and stored in circuit 30.

Optionally, temperature sensor 10 also comprises a circuit 32 connected to first capacitor 22 to determine the temperature applied thereto. For example, circuit 32 comprises means for measuring the capacitance of capacitor 22 and for determining the detected temperature according to the measured capacitance, particularly by polling a table of pressures according to the capacitance previously determined and stored in circuit 32.

Figure 2:
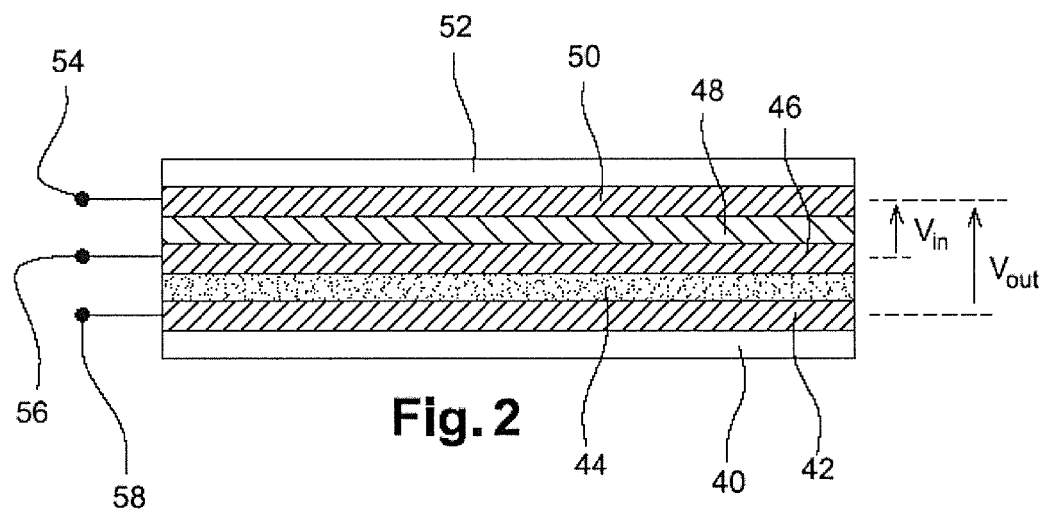
FIG. 2 is a simplified cross-section view of a stack forming the capacitors of the capacitive circuit of FIG. 1.

An embodiment of capacitors 22 and 24 is illustrated in the simplified cross-section view of FIG. 2. This drawing shows a stack formed on an insulating substrate 40. Substrate 40 is advantageously flexible and made of plastic, for example, PEN or PET. The stack comprises:

a first conductive electrode 42, for example, metallic or organometallic, formed on substrate 40;
a dielectric layer 44 used to form first capacitor 22;
a second conductive electrode 46, for example, metallic or organometallic;
a dielectric layer 48 used to form second capacitor 24;
a third conductive electrode 50, for example, metallic or organometallic; and
an insulating encapsulation layer 52, advantageously flexible and made of an insulator or of a dielectric having a low dielectric constant, for example, the same material as that forming dielectric layer 44.

First capacitor 22 is thus formed of dielectric layer 44 sandwiched between first electrode 42 and second electrode 46. Second capacitor 24 is formed of dielectric layer 48 sandwiched between second electrode 46 and third electrode 50.

Three terminals schematically illustrated at references 54, 56, 58 are respectively connected to the three electrodes 42, 46, and 50 to measure the different voltages.

Referring to simplified top views 3 to 8, a method of manufacturing a capacitive circuit comprising a stack such as described hereabove will now be described.

The method starts with the full-plate deposition of a metal layer on substrate 40, by a thickness in the range from 30 nm to 300 nm, for example, an Au, Cu, or Ag layer. The deposition for example is a physical vapor deposition ("PVD").

Figure 3:
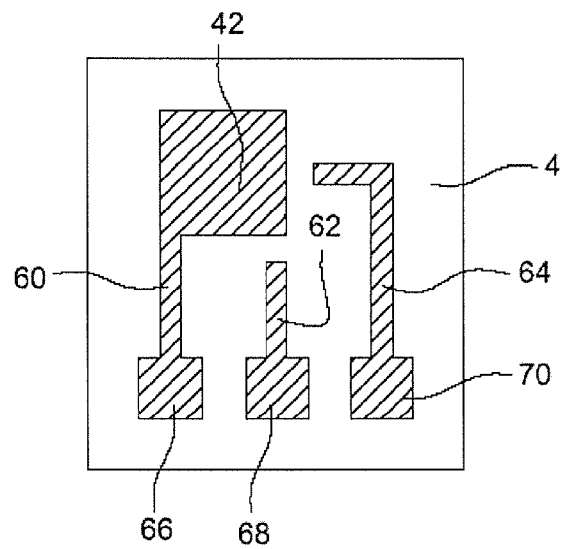

The method carries on with the removal of portions of the metal layer to form first electrode 42 on substrate 40, as well as three different metal tracks 60, 62, 64, each ending in a connection area 66, 68, 70. First track 60 is formed in continuation of electrode 42 (FIG. 3). These elements are for example formed by means of a photolithography or a laser etching, laser etching allowing a low-cost production.

Figure 4:
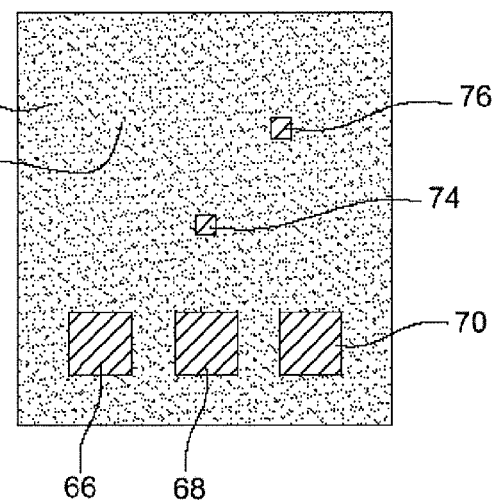

A first dielectric layer 72, advantageously a layer of fluorinated polymer having a low dielectric constant, of a thickness in the range from 0.1 micrometer to 2 micrometers, is then deposited on the assembly except on connection areas 66, 68, 70 and ends 74, 76 of the second and third tracks 62, 64 (FIG. 4). For example, layer 72 is formed by silk-screening. The assembly is then annealed.

Figure 5:
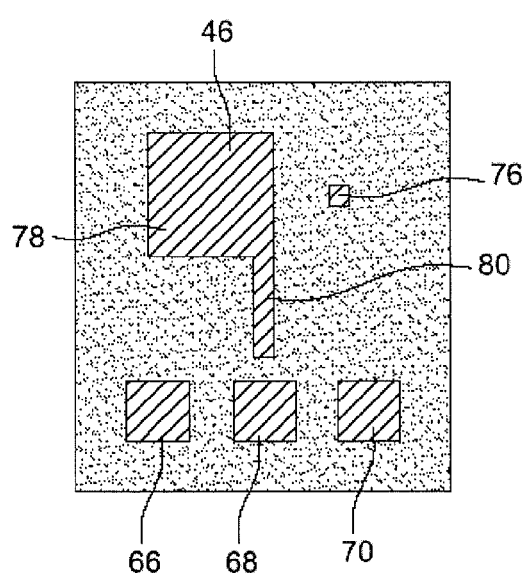

A metal layer 78, having a thickness in the range from 5 micrometers to 15 micrometers, for example, an Ag layer, is then deposited, for example, by silk screening, to form second electrode 46 vertically above first electrode 42, as well as a metal track 80 prolonging electrode 46. Metal track 80 is deposited above end 74 of second track 62 to form an electric contact with this end (FIG. 5). The assembly is then annealed.

The method then carries on with the deposition of a second dielectric layer 82, advantageously a PVDF-CTFE layer, having a thickness in the range from 1 micrometer to 5 micrometers, except on connection areas 66, 68, 70 and end 76 of third track 64 (FIG. 6). This deposition is for example performed by silk screening by means of an ink based on PVDF-CTFE. Usually, PVDF-CTFE, which is a semi-crystalline polymer, is produced in the form of a powder. By dissolving the PVDF-CTFE powder in a solution comprising a first solvent, N-M-methyl-2-pyrrolidone (known as "NMP"), and a second solvent, propyl methoxyacetate (known as "PMA") with a minority amount of acetone, an ink having a viscosity compatible with silk-screening deposition and spin-coating techniques is obtained. Once the PVDF-CTFE layer has been deposited, the assembly is annealed.

A metal layer 84, having a thickness in the range from 5 micrometers to 15 micrometers, for example, an Ag layer, is then deposited, for example, by silk screening, to form third electrode 50 vertically above first and second electrodes 42, 46, as well as a metal track 86 prolonging electrode 50. Metal track 86 is deposited above end 76 of third track 64 to form an electric contact with this end (FIG. 7). The assembly is then annealed.

Finally, an encapsulation layer is deposited on the assembly, except on connection areas 66, 68, 70, advantageously a flexible dielectric insulating layer, for example, the same material as that forming dielectric layer 44. A metallization of the vias above connection areas 66, 68, 70 is then achieved to obtain connection terminals 54, 56, 58 (FIG. 8).

A very compact and flexible capacitive circuit enabling to measure both temperature and pressure is thus obtained. The techniques used are further conventional and enable to obtain, if need be, planar capacitors having very large surface areas.

Figure 9:
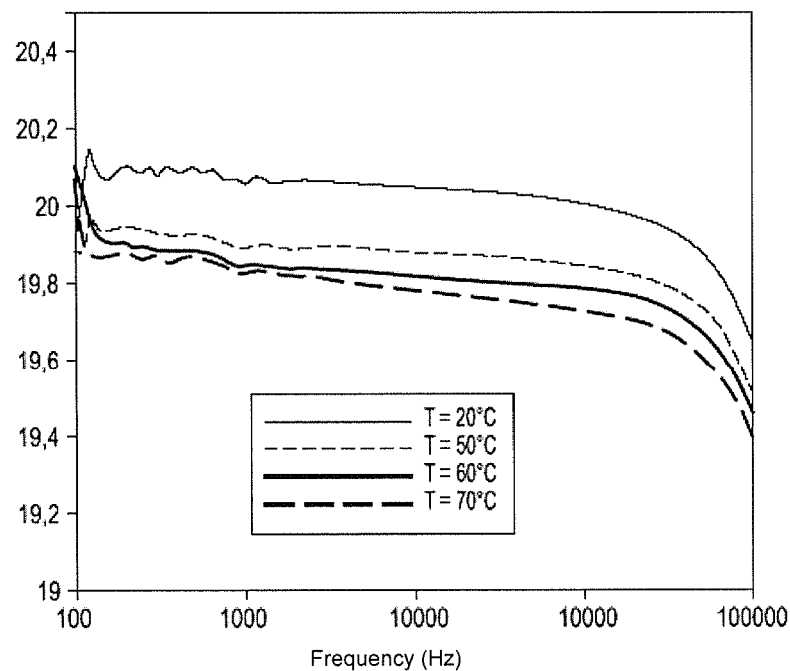
FIGS. 9 and 10 are plots of the capacitance of the first and of the second capacitor of the capacitive circuit respectively according to frequency and for different temperatures.

FIG. 9 is a plot of several capacitance curves of first capacitor 42, 44, 46 according to the frequency of the voltage applied between terminals 56, 58, and for different temperatures. The facing surface area of the electrodes is in this example equal to 2 $mm^2$. As can be observed, the capacitance value decreases as temperature increases.

Figure 10:
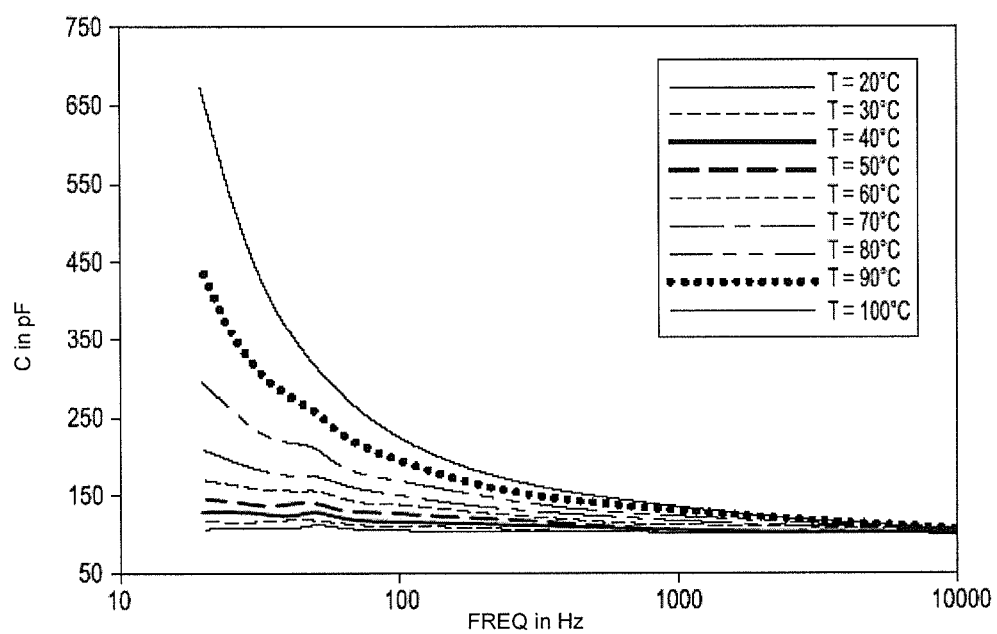

FIG. 10 is a plot of several capacitance curves of second capacitor 46, 48, 50 according to the frequency of the voltage applied between terminals 54, 56, and for different temperatures. The facing surface area of the electrodes is in this example equal to 1.77 $mm^2$. As can be observed, the capacitance value increases as temperature increases.

As can be seen in FIGS. 8 and 9, there appears that by integrating both capacitors in the capacitive circuit according to the above-described connection diagram, a temperature sensor of high sensitivity covering a temperature range at least from 20° C. to 90° C. at low and medium frequency is obtained. Voltage $V_{in}$ may be adaptable to the sensor and in the case illustrated by the curves, its amplitude is in the range from 0.5 volt to a few volts.

What is claimed is:

1. A temperature sensor comprising:
    a capacitive circuit comprising an input terminal for the application of an input voltage, an output terminal for the reading of an output voltage of the circuit, and a reference potential terminal;
    a voltage circuit for applying a predetermined voltage to the input terminal of the circuit; and
    a circuit for reading the voltage at the output terminal of the capacitive circuit and converting the read voltage into a temperature measurement,
    wherein the capacitive circuit comprises:
    a first capacitor connected between the input and output terminals, and having a capacitance decreasing according to temperature; and
    a second capacitor connected between the input terminal and the terminal at the reference potential, and having a capacitance increasing along with temperature.

2. The temperature sensor of claim 1, wherein the capacitive circuit comprises an insulating substrate and a stack formed on a substrate, successively comprising:
a first conductive electrode formed on the substrate;
a first dielectric layer;
a second conductive electrode;
a second dielectric layer; and
a third conductive electrode,
the first capacitor being formed by the first dielectric layer sandwiched between the first electrode and the second electrode, and the second capacitor being formed by the second dielectric layer sandwiched between the second electrode and the third electrode.

3. The temperature sensor of claim 2:
wherein first, second, and third different conductive tracks, each comprising a conductive connection area, are formed on the insulating substrate, the first track being connected to the first electrode;
wherein the first dielectric layer is deposited on at least the first electrode and a portion of the second track;
wherein the second electrode is deposited on the first dielectric layer at least vertically above the first electrode and a portion of the second track, the second electrode being connected to the second track by means of a metal connection crossing the first dielectric layer;
wherein the second dielectric layer is deposited on at least the second electrode and vertically above a portion of the third track; and
wherein the third electrode is deposited on the second dielectric layer at least vertically above the second electrode and a portion of the third track, the third electrode being connected to the third track by means of a metal connection crossing the first and second dielectric layers.

4. The temperature sensor of claim 2, wherein the first dielectric is a fluorinated polymer having a dielectric constant smaller than or equal to 2.

5. The temperature sensor of claim 4, wherein the first dielectric layer has a thickness in the range from 0.1 micrometer to 2 micrometers.

6. The temperature sensor of claim 4, wherein the temperature sensor comprises a circuit for reading the capacitance of the first capacitor and for converting the read capacitance into a temperature measurement detected on the first capacitor.

7. The temperature sensor of claim 2, wherein the second dielectric is a ferroelectric polymer or copolymer.

8. The temperature sensor of claim 7, wherein the second dielectric layer has a thickness in the range from 1 micrometer to 5 micrometers.

9. The temperature sensor of claim 7, wherein the first dielectric is a piezoelectric ferroelectric polymer or copolymer, and wherein the sensor comprises a circuit for reading the voltage at the input terminal and for converting the read voltage into a measurement of a pressure applied to the electrodes of the second capacitor.

10. The temperature sensor of claim 2, wherein each of the first, second, and third electrodes has a thickness in the range from 30 nanometers to 15 micrometers.

11. The temperature sensor of claim 2, wherein the substrate is a flexible plastic substrate.

12. The temperature sensor of claim 7, wherein the second dielectric is polyvinylidene fluoride-chlorotrifluoroethylene, or a polyvinylidene fluoride, or a copolymer of one and/or the other thereof.

13. The temperature sensor of claim 11, wherein the substrate is made of PEN or PET.

* * * * *